United States Patent
Basu Mallick et al.

(10) Patent No.: US 11,304,039 B2
(45) Date of Patent: Apr. 12, 2022

(54) AGGREGATING HARQ FEEDBACK

(71) Applicant: Lenovo (Singapore) PTE. LTD., New Tech Park (SG)

(72) Inventors: Prateek Basu Mallick, Dreieich (DE); Joachim Loehr, Wiesbaden (DE); Karthikeyan Ganesan, Kaiserslautern (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 79 days.

(21) Appl. No.: 16/827,203

(22) Filed: Mar. 23, 2020

(65) Prior Publication Data

US 2020/0304969 A1 Sep. 24, 2020

Related U.S. Application Data

(60) Provisional application No. 62/822,654, filed on Mar. 22, 2019.

(51) Int. Cl.
| | |
|---|---|
| *H04W 4/40* | (2018.01) |
| *H04L 1/18* | (2006.01) |
| *H04L 5/00* | (2006.01) |
| *H04W 72/04* | (2009.01) |
| *H04W 92/18* | (2009.01) |

(52) U.S. Cl.
CPC ............. *H04W 4/40* (2018.02); *H04L 1/1819* (2013.01); *H04L 5/0055* (2013.01); *H04W 72/042* (2013.01); *H04W 92/18* (2013.01)

(58) Field of Classification Search
CPC ..... H04W 4/40; H04W 72/042; H04W 92/18; H04L 1/1819; H04L 5/0055
See application file for complete search history.

(56) References Cited

U.S. PATENT DOCUMENTS

| | | | |
|---|---|---|---|
| 9,749,093 B2 * | 8/2017 | Seo ........................ | H04W 76/19 |
| 10,375,681 B2 * | 8/2019 | Papasakellariou .... | H04L 1/1854 |
| 10,574,404 B2 * | 2/2020 | Kim ........................ | H04L 1/0067 |

(Continued)

FOREIGN PATENT DOCUMENTS

WO  WO-2020092831 A1 *  5/2020  ........... H04L 1/0034

OTHER PUBLICATIONS

PCT/IB2020/000210, "Notification of Transmittal of the International Search Report and the Written Opinion of the International Searching Authority, or the Declaration", dated Jun. 26, 2020, pp. 1-11.

(Continued)

*Primary Examiner* — Michael J Moore, Jr.
(74) *Attorney, Agent, or Firm* — Kunzler Bean & Adamson

(57) ABSTRACT

Apparatuses, methods, and systems are disclosed for aggregating HARQ feedback and sidelink retransmission procedure. One apparatus includes a transceiver that transmits SL data to a set of receiver V2X UEs and listens for SL feedback from the set of the receiver V2X UEs. Here, the SL feedback indicates whether a receiver V2X UE successfully decoded the SL data transmission. The apparatus also includes a processor that aggregates HARQ feedback and sends an Aggregated Feedback message to a RAN node, the Aggregated Feedback message containing the aggregated HARQ feedback.

18 Claims, 8 Drawing Sheets

(56) References Cited

U.S. PATENT DOCUMENTS

| | | | | |
|---|---|---|---|---|
| 2013/0223318 | A1* | 8/2013 | Liu | H04W 4/06 |
| | | | | 370/312 |
| 2019/0052436 | A1* | 2/2019 | Desai | H04L 1/1671 |
| 2019/0394624 | A1* | 12/2019 | Karampatsis | H04W 48/18 |
| 2020/0092685 | A1* | 3/2020 | Fehrenbach | H04B 7/2606 |
| 2020/0100255 | A1* | 3/2020 | Wu | H04W 72/085 |
| 2020/0106567 | A1* | 4/2020 | Bharadwaj | H04L 1/1854 |
| 2020/0112400 | A1* | 4/2020 | Lee | H04L 1/1819 |
| 2020/0154404 | A1* | 5/2020 | Goktepe | H04L 1/1664 |
| 2020/0162207 | A1* | 5/2020 | Hwang | H04L 1/1812 |
| 2020/0235891 | A1* | 7/2020 | Lei | H04L 1/1822 |
| 2020/0244424 | A1* | 7/2020 | Froberg Olsson | H04L 1/1812 |
| 2020/0266939 | A1* | 8/2020 | Wang | H04L 1/0026 |
| 2020/0267597 | A1* | 8/2020 | Huang | H04L 1/1812 |
| 2020/0295878 | A1* | 9/2020 | Choi | H04W 72/1273 |
| 2020/0304969 | A1* | 9/2020 | Basu Mallick | H04W 4/40 |
| 2020/0396024 | A1* | 12/2020 | Ganesan | H04L 1/1812 |
| 2020/0403751 | A1* | 12/2020 | Baldemair | H04L 1/0027 |
| 2021/0037603 | A1* | 2/2021 | Li | H04L 5/0048 |
| 2021/0075556 | A1* | 3/2021 | Karaki | H04W 74/0816 |

OTHER PUBLICATIONS

Samung, "Considerations on Sidelink HARQ Procedure", 3GPP TSG RAN WG1 #96 R1-1902278, Feb. 25-Mar. 1, 2019, pp. 1-11.
Interdigital Inc., "Discussion on Physical Layer Procedures for NR V2X Sidelink", 3GPP TSG RAN WG1 #96 R1-1902596, Feb. 25-Mar. 1, 2019, pp. 1-9.
3GPP, "3rd Generation Partnership Project; Technical Specification Group Radio Access Network; NR; Radio Resource Control (RRC) protocol specification specification (Release 15)", 3GPP TS 38.331 V15.4.0, Dec. 2018, pp. 1-474.

* cited by examiner

Example DCI 500

| | | |
|---|---|---|
| DCIFormat | — | 'Format5A' |
| CIF | 3 bits | Carrier Indicator |
| FirstSubchannelIdx | $\text{Ceil}(\log_2(N^{SL-sc}))$ | Lowest index of the subchannel allocation to the initial transmission |
| RIV | $\text{Ceil}(\log_2(N^{SL-sc}(N^{SL-sc}+1)/2))$, [from 0 to 13 bits] | Resource Indication Value |
| TimeGap | 4 bits | Time gap between initial transmission and retransmission |

FIG. 5

AGGREGATING HARQ FEEDBACK

CROSS-REFERENCE TO RELATED APPLICATIONS

This application claims priority to U.S. Provisional Patent Application No. 62/822,654 entitled "Efficient Vehicular Sidelink Retransmissions" and filed on Mar. 22, 2019 for Prateek Basu Mallick, Joachim Loehr, Karthikeyan Ganesan and Ravi Kuchibhotla, which application is incorporated herein by reference.

FIELD

The subject matter disclosed herein relates generally to wireless communications and more particularly relates to sidelink retransmission for NR vehicular communication.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Positive-Acknowledgment ('ACK'), Application Programming Interface ("API"), Access Stratum ("AS"), Base Station ("BS"), Control Element ("CE"), Channel State Information ("CSI"), Connection Mode ("CM", this is a NAS state in 5GS), Core Network ("CN"), Control Plane ("CP"), Data Radio Bearer ("DRB"), Dedicated Short Range Communication ("DSRC"), Downlink Control Information ("DCI"), Downlink ("DL"), Discontinuous Transmission ('DTX'), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), Frequency Division Duplex ("FDD"), Frequency Division Multiple Access ("FDMA"), General Packet Radio Service ("GPRS"), Global System for Mobile Communications ("GSM"), Hybrid Automatic Repeat Request ("HARQ"), Home Subscriber Server ("HSS"), Home Public Land Mobile Network ("HPLMN"), Information Element ("IE"), Long Term Evolution ("LTE"), Mobility Management ("MM"), Mobility Management Entity ("MME"), Negative-Acknowledgment ('NACK') or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Network Slice Selection Assistance Information ("NSSAI"), Orthogonal Frequency Division Multiplexing ("OFDM"), Packet Data Unit ("PDU", used in connection with 'PDU Session'), Packet Switched ("PS", e.g., Packet Switched domain or Packet Switched service), Physical Broadcast Channel ("PBCH"), Physical Cell Identity ("PCI"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Sidelink Control Channel ("PSCCH"), Physical Sidelink Shared Channel ("PSSCH"), Physical Sidelink Feedback Channel ("PSFCH"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Resource Control ("RRC"), Random-Access Channel ("RACH"), Reference Signal ("RS"), Registration Area ("RA", similar to tacking area list used in LTE/EPC), Registration Management ("RM", refers to NAS layer procedures and states), Receive ("RX"), Radio Link Control ("RLC"), Scheduling Request ("SR"), Shared Channel ("SCH"), Session Management ("SM"), Session Management Function ("SMF"), Service Provider ("SP"), Sidelink Control Information ("SCI"), Signal-to-Interference-Plus-Noise Ratio ("SINR"), Single Network Slice Selection Assistance Information ("S-NSSAI"), Sounding Reference Signal ("SRS"), System Information Block ("SIB"), Supplementary Uplink ("SUL"), Tracking Area ("TA"), Transport Block ("TB"), Transport Block Size ("TBS"), Time-Division Duplex ("TDD"), Time Division Multiplex ("TDM"), Transmission/Reception Point ("TRP", can be a UE or BS), Transmission Time Interval ("TTI"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), Visited Public Land Mobile Network ("VPLMN"), and Worldwide Interoperability for Microwave Access ("WiMAX"). As used herein, "HARQ-ACK" may represent collectively the Positive Acknowledge ('ACK') and the Negative Acknowledge ('NACK') and Discontinuous Transmission ('DTX'). ACK means that a TB is correctly received while NACK (or NAK) means a TB is erroneously received. DTX means that no TB was detected.

In certain wireless communication systems, V2X communication allows vehicles to communicate with moving parts of the traffic system around them. Two resource allocation modes are used in LTE V2X communication and similar modes are defined for NR V2X communication. These modes support direct V2X communications but differ on how they allocate the radio resources. Mode-1 corresponds to a NR network-scheduled V2X communication mode. Mode-2 corresponds to a NR UE-scheduled V2X communication mode. Mode-3 corresponds to an LTE network-scheduled V2X communication mode. Mode-4 corresponds to an LTE UE-scheduled V2X communication mode.

In case of Mode-1 and Mode-3, resources are allocated by the cellular network, e.g., gNB for Mode-1 and eNB, for the Mode-3. In case of Mode-2 and Mode-4, these do not require cellular coverage, and vehicles autonomously select their radio resources using a distributed scheduling scheme supported by congestion control mechanisms from pre-configured resource Pool(s). Mode-2 and Mode-4 resources can also be allocated by the RAN for in-coverage UEs.

In LTE V2X, HARQ operation is limited to blind retransmission without any HARQ feedback. NR V2X communication may support HARQ feedback signaling for SL transmission. However, it is unclear how the transmitting V2X UE is to report the necessity of re-transmission to gNB and receive suitable re-transmission resources.

BRIEF SUMMARY

Disclosed are procedures for aggregating HARQ feedback and sidelink retransmission procedure. One method of a transmitter V2X UE, e.g., for aggregating HARQ feedback and sidelink retransmission procedure, includes transmitting SL data to a set of receiver V2X UEs and listening for SL feedback from the set of receiver V2X UEs, the SL feedback indicating whether a receiver V2X UE successfully decoded the SL data transmission. The method includes aggregating HARQ feedback in the transmitter V2X UE and transmitting an Aggregated Feedback message to a RAN node, the Aggregated Feedback message containing the aggregated HARQ feedback.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a diagram illustrating one embodiment of a DCI format;

DETAILED DESCRIPTION

Figure 1:
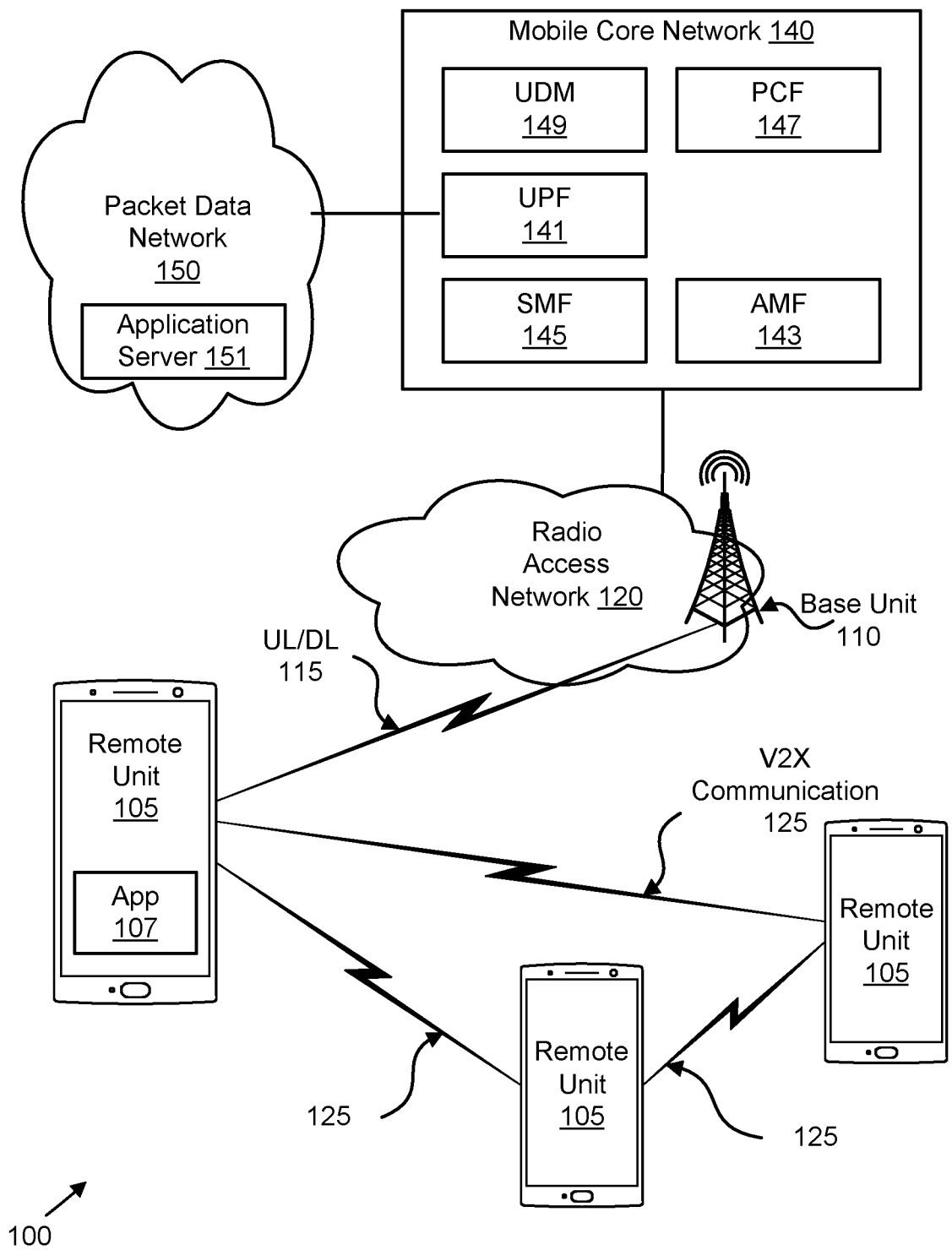
FIG. 1 is a schematic block diagram illustrating one embodiment of a wireless communication system for aggregating HARQ feedback and sidelink retransmission procedure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for aggregating HARQ feedback and sidelink retransmission procedure for UEs engaged in V2X communication. "V2X" (vehicle-to-everything) refers sidelink communications may include one or more of: "V2I" (vehicle-to-infrastructure) communications, "V2N" (vehicle-to-network), "V2V" (vehicle-to-vehicle) communications, "V2P" (vehicle-to-pedestrian), "V2D" (vehicle-to-device) and "V2G" (vehicle-to-grid) communications. A V2X UE refers to a UE capable of vehicular communication using 3GPP protocol(s).

Mode-1 and Mode-2 support direct NR V2X communications but differ on how they allocate the radio resources. Likewise, Mode-3 and Mode-4 support direct LTE V2X communications but differ on how they allocate the radio resources. For Mode-1 and Mode-3, sidelink resources are allocated by the cellular network, e.g., gNB for Mode-1 (NR V2X) and eNB for Mode-3 (LTE V2X). As such, at least the transmitter V2X UE must be in-coverage of the NR/LTE RAN. In contrast, Mode-2 and Mode-4 do not require cellular network coverage, and vehicles (i.e., UEs) autonomously select their radio resources using a distributed scheduling scheme supported by congestion control mechanisms. Mode-4 is considered the baseline mode and represents an alternative to 802.11p or dedicated short range communications (DSRC).

All the resource allocation modes have been designed to satisfy the latency requirements and accommodate high Doppler spreads and high density of vehicles for V2X communications. For example, the maximum allowed latency may vary between 20 and 100 ms, depending on the application. Note that SL Resources are shared with the Uu uplink.

As noted above, Mode-1 and Mode-3 use the centralized RAN (gNB/eNB) scheduler. The vehicular UE and RAN use the Uu interface to communicate, e.g., sending of BSR/SR from the transmitting V2X UE to the RAN and receiving in response a SL grant on the PDCCH (DCI). Mode-2 and Mode-4 employ distributed UE scheduling, thus operating without infrastructure support, although the UEs could be in RAN coverage. The various modes use the PC5 interface, which offers direct sidelink (SL) communication between two or more UEs.

In LTE-based V2X only broadcast type transmission is supported, whereas in NR-based V2X, supports broadcast ("BC"), unicast ("UC") and groupcast ("GC") transmission types (also referred to as "cast types"). It is assumed that higher layers of the transmitter V2X UE indicate whether a packet is to be sent via unicast, groupcast, or broadcast. As used herein, "unicast" refers to the transmitter V2X UE having a single receiver V2X UE associated with the V2X transmission. As used herein, "groupcast" refers to the transceiver V2X UE communicating with a specific subset of V2X UEs in its vicinity (more than one UE, e.g., using a group address). In contrast, a broadcast transmission enables the transmitter V2X UE to communicate with all UEs that are in its range. Note that for unicast and groupcast transmissions, a receiver V2X UE will discard a packet not addressed to the V2X UE, e.g., individually or to a group of which the receiver V2X is a member.

In various embodiments, NR V2X operation supports HARQ with HARQ feedback signaling for SL transmissions, e.g., at least for unicast and groupcast SL transmission. In Mode-1 for unicast and groupcast, HARQ feedback signaling is supported for the transmitter UE via Uu link to report an indication to gNB to indicate the need for retransmission of a TB transmitted by the transmitter UE.

While the PC5 link efficiency may be improved using HARQ feedback, details of how the transmitter UE reports the necessity of re-transmission to gNB and receives suitable resources are not yet clear. Specifically, it is unclear how HARQ ACK/NACK can be indicated to the gNB if there are no resources available in UL. As not all SL transmissions require HARQ feedback, it may not be practical to allocate PUCCH ACK/NACK feedback resources for every possible transmission on sidelink.

The present disclosure outlines several methods for supporting efficient retransmission for V2X communication. In particular, the HARQ operation for a SL transmission in the resource allocation Mode-1 is disclosed. Furthermore, a new MAC CE is described for requesting re-transmission resources to the gNB.

FIG. 1 depicts a wireless communication system 100 for aggregating HARQ feedback and sidelink retransmission procedure for V2X wireless devices communicating messages via V2X communication signals 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for sidelink HARQ operation in NR V2X communication apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to a NR UE-scheduled V2X communication mode. Mode-3 corresponds to an LTE network-scheduled V2X communication mode. Mode-4 corresponds to an LTE UE-scheduled V2X communication mode.

Moreover, the remote units 105 implement SL HARQ processes for at least some data transferred over V2X communication signals 125. In certain embodiments, a transmitting remote unit 105 aggregates SL HARQ feedback and decides between groupcast-based retransmission or M-unicast-based retransmission. Here, 'M-unicast' refers to an integer number of unicast retransmissions required for V2X retransmission.

In various embodiments, the transmitting remote unit 105 transmits aggregated feedback to RAN 120 (e.g., gNB). Here, the aggregated feedback may include one or more of the following: a) aggregated PSFCH ACK/NAK feedback, b) request for either groupcast or M-unicast re-transmission, c) the number of V2X remote units 105 requiring retransmission (e.g., the integer 'M'), and d) the total number of group members (e.g., receiving V2X remote units 105). In certain embodiments, the RAN 120 (e.g., the base unit 110) makes a decision for either groupcast or M-unicast retransmission using the aggregated feedback. The base unit 110 signals the decision to the transmitting V2X remote unit 105, along with required resources. The transmitting V2X remote unit 105 then performs retransmission accordingly.

In various embodiments, the use of SL grant ID in DCI allows the transmitting V2X remote unit 105 to send the aggregated feedback in any UL transmission opportunity. In various embodiments, the transmitting V2X remote unit 105 uses a special MAC CE for requesting re-transmission resources to the base unit 110.

In the following descriptions, the term "RAN node" is used for the base station but it is replaceable by any other radio access node, e.g., BS, eNB, gNB, AP, NR, TRP, etc. Further the operations are described mainly in the context of 5G NR. However, the proposed solutions/methods are also equally applicable to other mobile communication systems supporting serving cells/carriers being configured for Sidelink Communication over PC5 interface.

Figure 2:
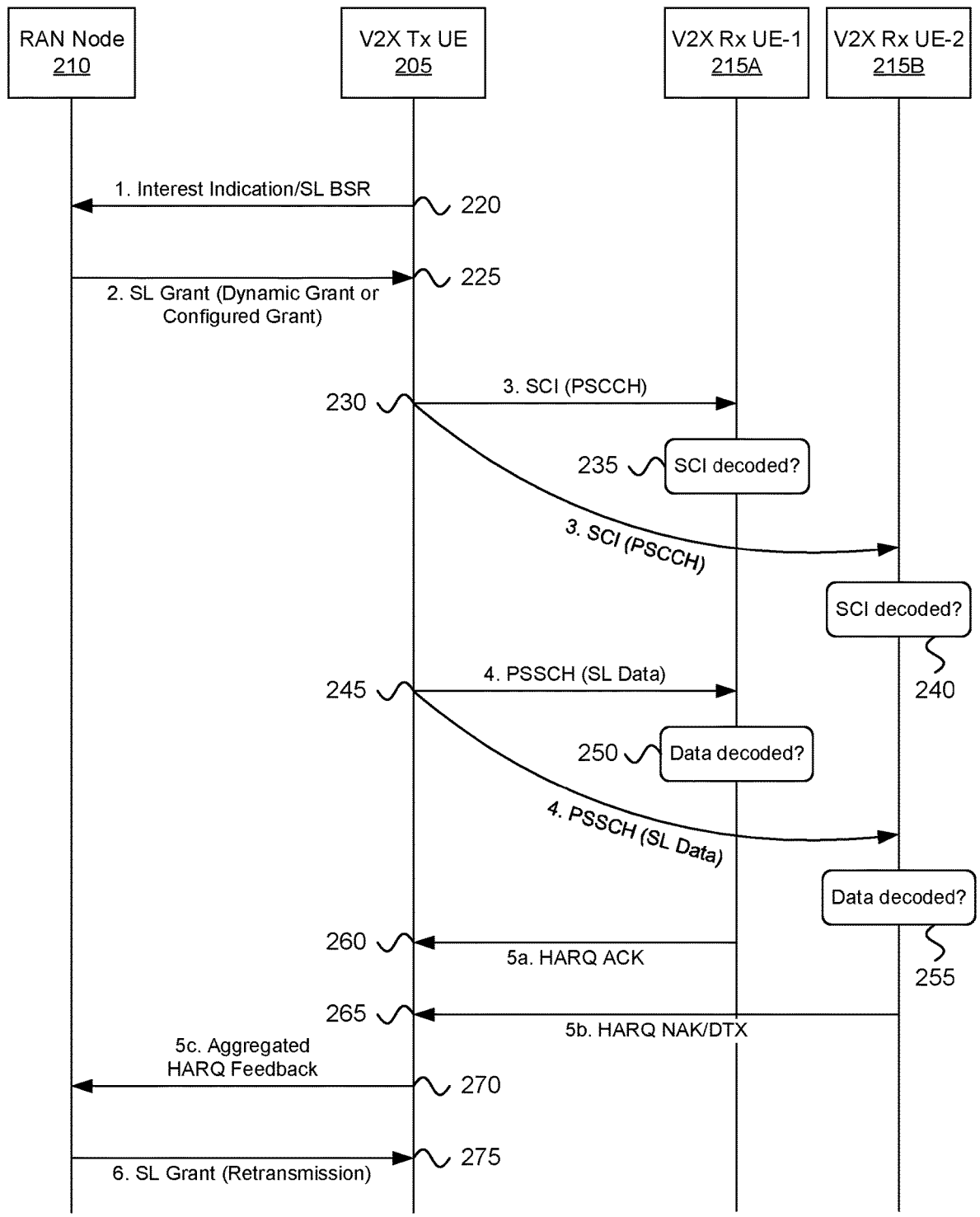
FIG. 2 is a diagram illustrating one embodiment of procedure for sidelink retransmission procedure.

FIG. 2 a signaling flow diagram for a procedure 200 for aggregating HARQ feedback in a V2X transmitting UE ("V2X Tx UE") 205, according embodiments of the disclosure. The procedure 200 shows one implementation of the first step in the procedure 300, discussed below with reference to FIG. 3. The procedure 200 involved the V2X Tx UE 205, a RAN node 210, and a plurality of V2X receiving UEs ("V2X Rx UEs") 215—shown are a first V2X receiving UE ("V2X Rx UE-1") 215A and a second V2X receiving UE ("V2X Rx UE-2") 215B.

The procedure 200 begins and the V2X Tx UE 205 sends an interest indicator (e.g., SL BSR/SR) to the RAN node 210 (see messaging 220) and receives in response a SL grant (e.g., Dynamic Grant or Configured Grant) in DCI on the PDCCH (see messaging 225). An example DCI format for SL grant is discussed below with reference to FIG. 5.

Upon receiving the grant for sidelink transmission in a NR DCI format, the V2X Tx UE 205 transmits SCI (PSCCH), e.g., after $K_a$ time units (e.g., milliseconds, OFDM symbols or similar) (see messaging 230). The V2X Rx UEs 215 will receive SCI and—after successfully decoding the same (see blocks 235, 240)—will attempt to receive and decode PSSCH (see messaging 245, blocks 250, 255). If any V2X Rx UE 215 is unable to successfully decode the PSSCH, it will feedback 'NACK' to the V2X Tx UE 205 (e.g., on PSFCH), as described in PCT/CN2019/074845, filed Feb. 12, 2019, titled "Feedback Request Determination," the contents of which are incorporated by reference. In certain embodiments, if the V2X Rx UE(s) 215 able to decode the PSSCH successfully will feedback 'ACK' to the V2X Tx UE 205 (e.g., on PSFCH), as described in PCT/CN2019/074845. Note that the Sidelink Control Information ("SCI") may indicate to the V2X Rx UEs 215 the SL HARQ resources to use for sending SL feedback (e.g., ACK/NACK), as described in PCT/CN2019/074845.

The V2X Tx UE 205 attempts to receive (i.e., "listens" for) SL feedback from the V2X Rx UE(s) over a specific window of time. The window of time may be UE implementation, pre-specified, and/or may be (pre)configurable. Note that if a V2X Rx UE 215 does not successfully receive and decode the SCI, then it will not attempt to receive/decode PSSCH and thus will not send feedback to the V2X Tx UE 205. In the depicted embodiment, the first V2X Rx UE 215A successfully decodes the PSSCH transmission (see block 250), but the second V2X Rx UE 215B is unsuccessful in decoding the PSSCH transmission (see block 255). As such, the first V2X Rx UE 215A sends ACK feedback to the V2X Tx UE 205 (see messaging 260), while the second V2X Rx UE 215B sends NACK feedback to the V2X Tx UE 205 (see messaging 265).

Upon receiving all feedback(s) until certain time (corresponding to the end of the feedback window), the V2X Tx UE 205 needs to aggregate the individual SL feedbacks. Feedback aggregation is discussed in further detail below, with reference to FIG. 3. Because at least the second V2X Rx UE 215B did not successfully receive the SL data (PSSCH), the Aggregated HARQ feedback message indicates that SL retransmission is needed (see messaging 270). As depicted, the RAN node 210 sends a SL grant for retransmission (see messaging 275), wherein the V2X Tx UE 205 then performs retransmission accordingly.

Figure 3:
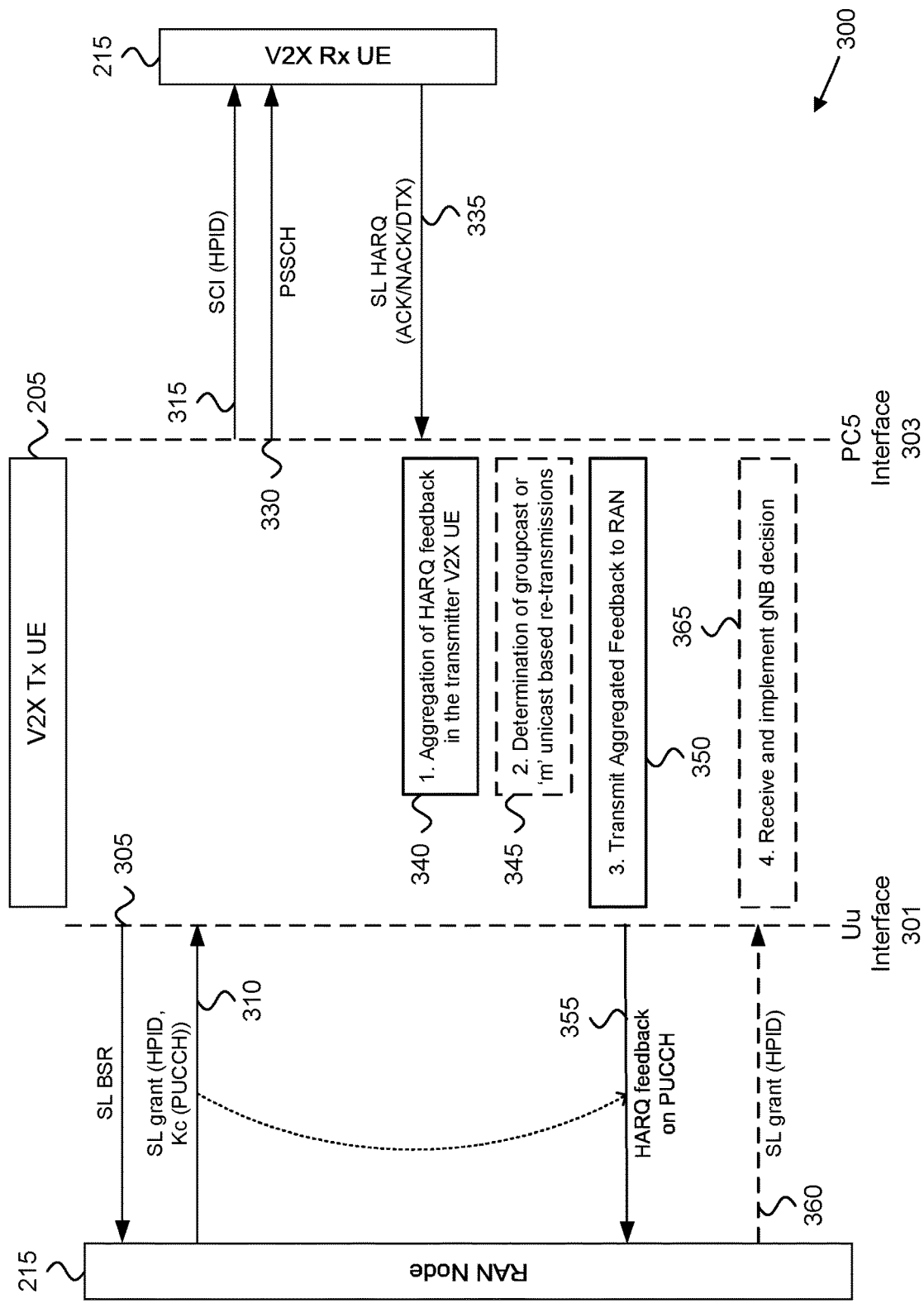
FIG. 3 is a diagram illustrating one embodiment of a signaling flow for aggregating HARQ feedback.

FIG. 3 depicts a procedure 300 for sidelink retransmission procedure, according embodiments of the disclosure. The procedure 300 involves the V2X transmitting UE ("V2X Tx UE") 205, the RAN node 210, and at least one V2X Rx UE 215.

The procedure 300 begins as the V2X Tx UE 205 sends a SL BSR (or other indication) to the RAN node 210 (see messaging 305) and receives (via Uu interface 301) a SL grant (e.g., Dynamic Grant or Configured Grant) in DCI on the PDCCH (see messaging 310). As depicted, the SL grant indicates a HARQ process ID ("HPID") and also allocates a PUCCH resource for aggregated HARQ feedback.

The V2X Tx UE 205 transmits (via PC5 interface 303) SCI to the V2X Rx UE(s) 215 and further transmits the SL TB on PSSCH (see messaging 315 and 320). Here, the SCI may indicate a HARQ process ID and may indicate resources (e.g., PSFCH) for sending SL feedback. While only one V2X Rx UE 215 is depicted in FIG. 3 for ease of illustration, in other embodiments the V2X Tx UE 205 transmits to multiple V2X Rx UEs 215.

As discussed above, each V2X Rx UE 215 receiving the SCI attempts to receive and decode the PSSCH 330. In certain embodiments, a V2X Rx UE 215 that successfully decodes the PSSCH transmits a SL HARQ ACK (see messaging 335). In certain embodiments, a V2X Rx UE 215 that fails to decode the PSSCH transmits a SL HARQ NACK (see messaging 335). In certain embodiments, a V2X Rx UE 215 that does not detect the PSSCH transmits a SL HARQ DTX (see messaging 335).

According to a first solution, the V2X Tx UE 205 sends aggregated HARQ feedback and optionally triggers SL retransmission as described in the following four steps:

In step 1, the V2X Tx UE 205 aggregates the SL HARQ feedback (see block 340). The aggregation can be done in one of the following ways:

According to the first option, if there is at least one NACK feedback received by the V2X Tx UE 205, it concludes that a re-transmission needs to be made for the said PSSCH transmission. Accordingly, the aggregated HARQ feedback is "NACK."

According to a second option, if a V2X Rx UE 215 is able to decode the PSSCH successfully, then it will feedback 'ACK' to the V2X Tx UE 205. In this case, the V2X Tx UE 205 determines whether all the intended recipients have been able to decode the said PSSCH transmission. This can be done by checking if the number of Acks received is same as the total number of receiving V2X UEs in the group. The value "total number of receiving V2X UEs in the group" can be determined based on application layer discovery and/or using the methods described in PCT/CN2019/074845. If the expected number of Ack feedback is not received by the V2X Tx UE 205, then the V2X Tx UE 205 concludes that a re-transmission needs to be made for the said PSSCH transmission (SL data). Accordingly, the aggregated HARQ feedback is 'NACK.'

According to a third option, if at least one ACK feedback is received from all expected V2X Rx UEs 215, then the aggregated HARQ feedback is 'ACK'. Note that the V2X Tx UE 205 may perform book-keeping to track from which V2X Rx UE 215 a feedback was received and if ACK or NACK was received, and from which V2X Rx UE 215 it has not yet received any feedback. Accordingly, an ACK should have been received from each V2X Rx UE 215 at least once (for any of the transmission or retransmissions) in order for the aggregated HARQ feedback to be 'ACK'.

According to a fourth option, if the V2X Tx UE 205 is not monitoring the "total number of receiving V2X UEs in the group" and only ACK feedback(s) is received until "certain time" (i.e., no NACK/DTX received during the feedback window), then the aggregated HARQ feedback is 'ACK'. Otherwise (i.e., if a NACK or DTX is received), the aggregated HARQ feedback is 'NACK' (see first option, above).

In Step 2, the V2X Tx UE 205 determines a number 'M' of V2X Rx UE(s) 215 that failed to decode the SL Data (see block 345, refer also FIG. 2 step 5a-5b). If 'M' is greater than a threshold number, then the V2X Tx UE 205 selects groupcast as the cast-type for re-transmission. Otherwise, the V2X Tx UE 205 selects iterative unicast (i.e., 'M' unicast re-transmissions) as the cast-type for re-transmission.

In Step 3, the V2X Tx UE 205 indicates the aggregated feedback to the RAN node 210 (see block 350 and messaging 355). To this end, one of more of the following information can be included in the Aggregated HARQ Feedback message shown in step 5c of FIG. 3: A) Aggregated Feedback (ACK or NACK), as described previously, B) Request/Suggestion for groupcast or 'M' unicast re-transmissions (i.e., according, to the cast-type selected in Step 2), C) The integer 'M', and D) the total number of group members and/or total number of group members providing HARQ feedback. Recall, 'M' represents the number of V2X Rx UE(s) 215 that failed to decode the SL Data.

If all the intended recipients have successfully received and decoded the PSSCH packet, the V2X Tx UE 205 signals an ACK to the RAN node 210 at a specific transmission opportunity. Alternatively, the V2X Tx UE 205 may perform DTX at the said specific transmission opportunity. Upon receiving the ACK (or DTX), the RAN node 210 may concludes that the transmitter does not need any re-transmission resources for the said PSSCH transmission.

To transmit the HARQ feedback (aggregated), the transmitter needs resources for transmission to RAN node 210. As an example, if the transmitter concludes that a re-transmission needs to be made for the said PSSCH transmission, it needs resources for transmission of NACK to RAN node 210. These resources carry one or more of the information described by Aggregated HARQ Feedback Message items A-D, above. Further details on transmitting the Aggregated HARQ Feedback Message are discussed below with reference to FIG. 4.

In Step 4, the RAN node 210 may decide if the V2X Tx UE 205 is to be given resources for groupcast or rather for 'M' Unicast re-transmissions based on its implementation and signal the result (i.e., SL grant for re-transmission and optionally indicate the cast-type) along with as many/much required resources for re-transmission(s) to the V2X Tx UE 205 (see optional messaging 360). The V2X Tx UE 205 receives and implements the SL grant for retransmission (see block 365).

Figure 4:
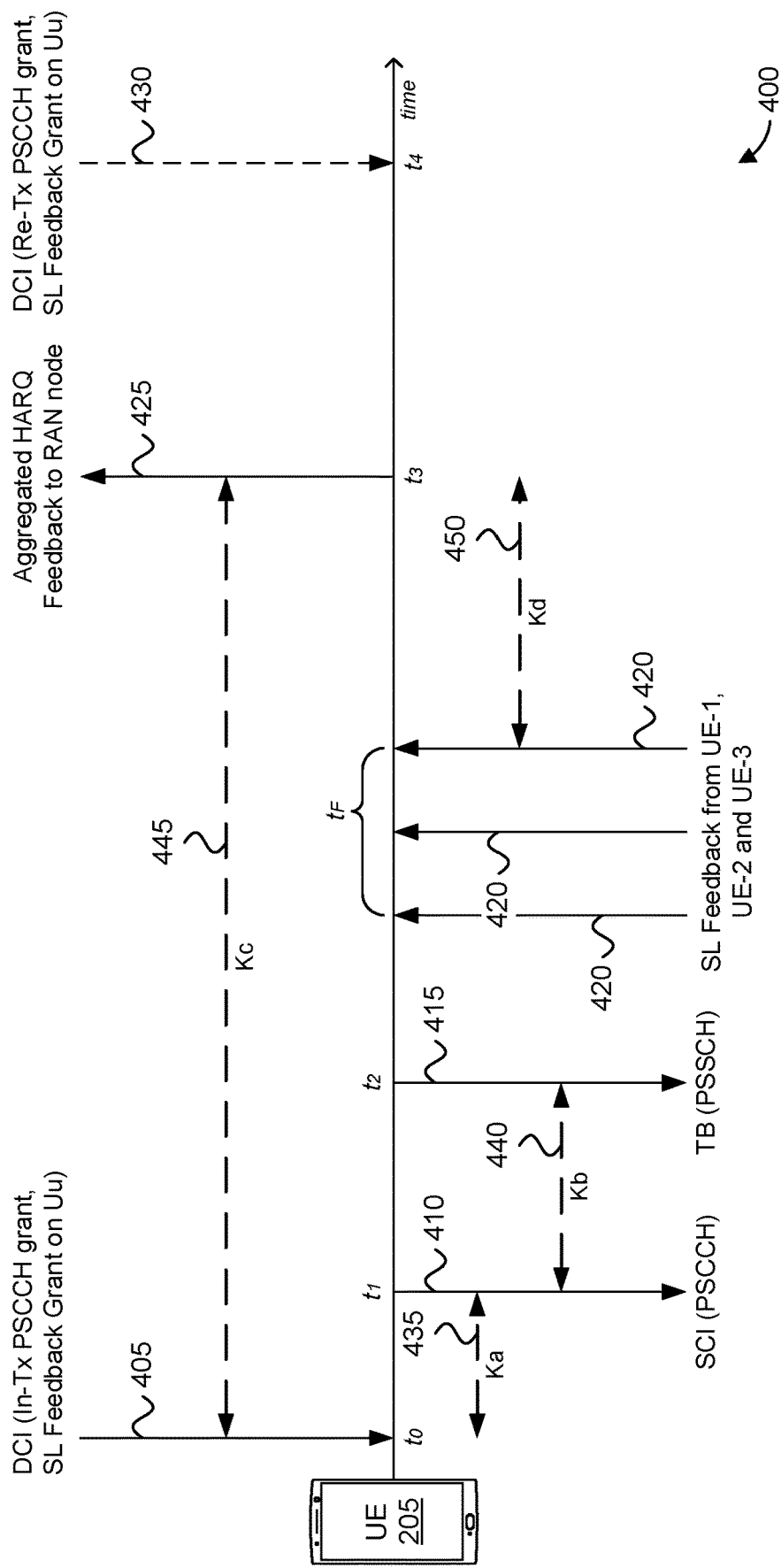
FIG. 4 is a diagram illustrating one embodiment of a timeline for sidelink transmission and retransmission.

FIG. 4 depicts a timeline 400 of transmission and re-transmission, according to embodiments of the disclosure. The timeline 400 is form the perspective of the V2X Tx UE 205, which communicates with a RAN node 210 (not shown in FIG. 5) and at least three V2X Rx UEs 215 (i.e., UE-1, UE-2, and UE-3).

At time '$t_0$', the V2X Tx UE 205 receives a DCI grant 405 for initial transmission ("In-Tx") of PSSCH packet on PC5. Here, the DCI grant 405 also allocates resources for transmission of SL feedback to RAN node 210.

At time '$t_1$', the V2X Tx UE 205 sends SCI 410 in PSCCH on PC5. The interval 435 between receiving the DCI and sending the SCI is $K_a$ time units (e.g., milliseconds, OFDM symbols or similar) after the reception of the said DCI.

At time '$t_2$', the V2X Tx UE 205 sends a packet (TB) 415 in PSSCH on PC5. The interval 440 between sending the SCI and sending the PSSCH is $K_b$ time units after the reception of the said SCI.

During the window '$t_F$,' the V2X Tx UE 205 listens for SL feedback 420 (e.g., on PSFCH) from the group of V2X Rx UE 215. In the depicted embodiment, HARQ feedback is received from the UE-1, UE-2, and UE-3. As discussed above, each Rx UE 215 may send ACK, NACK or DTX. The V2X Tx UE 205 prepares aggregated feedback according to the principles described herein.

At time '$t_3$', the V2X Tx UE 205 sends aggregated HARQ feedback 425 in PUCCH on Uu. The interval 445 between receiving the DCI and sending the aggregated HARQ feedback 425 is Kc time units after the reception of the said DCI. The interval 450 between the end of the window $t_F$ (i.e., last PSFCH opportunity) and the sending of the aggregated HARQ feedback is $K_d$ time units after the end of the window.

The resources for transmission of the aggregated HARQ feedback to RAN node 210 are available after $K_c$ time units from the reception of the said DCI (alternatively, after $K_d$ time units from the end of the window $t_F$). The parameter '$K_c$' (alternatively, the parameter $K_d$) may be signaled in the DCI 405. In addition, the actual PRB resources for feedback transmission can be done, for example using the 'pucch-ResourceCommon' information element.

In some embodiments, an integer (0 . . . 15) signaled in the DCI 405 points to an entry into a 16-*row* table where each row configures a set of cell-specific PUCCH resources/ parameters. Alternatively, in other embodiments the network provides a dedicated PUCCH-Config corresponding to a (active) bandwidth part, for example using the 'n1PUCCH-An' information element, HARQ resource used otherwise for PUCCH for DL SPS. The actual PUCCH-Resource is configured in PUCCH-Config, e.g., as described in 3GPP TS 38.331-f40. The feedback resource on PUCCH may be also implicitly allocated, e.g., depends on the first CCE index of PDCCH (SL grant). Alternatively, the PUCCH resources for ACK/NACK transmission ("A/N PUCCH resources") could be linked to PSSCH resources included in the DCI format (e.g., DCI format 5A).

At time '$t_4$', the RAN node 210 optionally sends a DCI grant 430 for retransmission of the PSSCH packet on PC5 (e.g., for the case where the Aggregated HARQ feedback indicates 'NACK' for at least on V2X Rx UE 215). Here, the V2X Tx UE 205 again sends SCI and PSSCH and receives SL HARQ feedback for the retransmission as described above.

FIG. 5 depicts an example DCI 500, according to embodiments of the disclosure. Where the A/N PUCCH resources are linked to PSSCH resources included in the DCI format (e.g., the depicted DCI format 5A), the ACK/NACK resource feedback from the V2X Tx UE 205 to the RAN node 210 may be transmitted at an Offset from the parameter 'FirstSubchannelIdx' or from the last PRB of the PSSCH (e.g., FirstSubchannelIdx+RIV+Offset). Here, the Offset may be predefined or may be signaled in the said DCI, together with $K_c$.

Therefore, using the resources indicated implicitly or explicitly in the DCI, the Aggregated HARQ Feedback message is transmitted to RAN node 210 after $K_c$ time units.

Referring again to FIG. 3, in Step 4 the RAN node 210 decides whether the V2X Tx UE 205 is to be given resources for groupcast or rather for 'M' Unicast re-transmissions based on its implementation and signal the result (re-transmission grant and optionally the cast-type) along with as many/much required resources for re-transmission(s) to the V2X Tx UE 205. The V2X Tx UE makes re-transmission(s) accordingly.

In an alternative implementation of FIG. 3, the DCI allocating the PC5 transmission grant to the V2X Tx UE may be identified using a grant-ID (e.g., 'SL grant ID'). The aggregated feedback will be signaled back to the RAN node 210 by the V2X Tx UE 205 indicating this grant-ID. This allows the V2X Tx UE to send the aggregated feedback in any UL transmission opportunity without having to wait until $K_c$ time units. In various embodiments, the 'grant-Id' can also be a HARQ process ID.

According to a second solution, a new MAC control element ("MAC CE") is used to request re-transmission resources to the RAN node 210. This new MAC CE is designed with a corresponding reserved logical channel ID. The V2X Tx UE 205 is to trigger a scheduling request ("SR") if there are no resources available to transmit the MAC CE and in that sense this MAC CE is allowed to trigger SR. The scheduling request ("SR") configuration can be specific for this purpose.

In the MAC CE, the V2X Tx UE 205 indicates a grant-ID which is same as the one that network signals in the DCI used for communicating the transmission grant for the said PSSCH transmission. Based on this grant-ID, the network can know exactly the resource size for re-transmission of the said packet on PC5. Alternatively, the V2X Tx UE 205 may include a Buffer Occupancy ("BO") with the same size as for the initial TB transmission of the said PSSCH packet in the said MAC CE. As a further alternative, one or more of the following information is included in the MAC CE: a) Aggregated Feedback (ACK or NACK) as described previously, b) Request/Suggestion for groupcast or 'M' unicast re-transmissions; c) The integer 'M'; and d) Total number of group members and/or Total number of group members providing HARQ feedback.

Next, a RAN node 210 decision follows on groupcast or M-unicast, signaling the same to the V2X Tx UE 205 along with as many/much required resources and V2X Tx UE 205 making then required re-transmission(s) accordingly.

In various embodiments, the RAN node 210 in DCI for scheduling transmission from the V2X Tx UE 205 (message 220 in FIG. 2) includes 'n' UL ACK/NACK Feedback resources which the transmitter will use to transmit/forward the individual feedback(s) from the V2X Rx UE(s) 215. The V2X Tx UE 205 does not perform any feedback aggregation in this case.

In various embodiments, the RAN node 210 in DCI for scheduling transmission from the V2X Tx UE 205 (message 220 in FIG. 2) includes resources for 'n' CSI Reports which includes CQI, RI, PMI or non-codebook which the transmitter will use to transmit/forward the individual CSI report(s) from the V2X Rx UE(s) 215. The V2X Tx UE 205 may or may not perform any CSI aggregation using an indicated compression in this case. In another embodiment, the V2X Rx UE(s) 215 indicates the CSI report directly to the RAN node 210 using the resources provided by RAN node 210 in the DCI (forwarded by the V2X Tx UE 205 to the V2X Rx UE(s) 215).

In case a Mode switch happens after the transmission of the SL Data and the V2X Tx UE 205 needs to switch to Mode-2 based resource allocation, the V2X Tx UE 205 is to revert to the RAN node 210 indicating that the allocated ACK/NACK resources in the DCI message are no more required. In another embodiment, the V2X Tx UE 205 does not switch mode if the ACK/NACK resources in the DCI message are provided by the RAN node 210 already.

Figure 6:
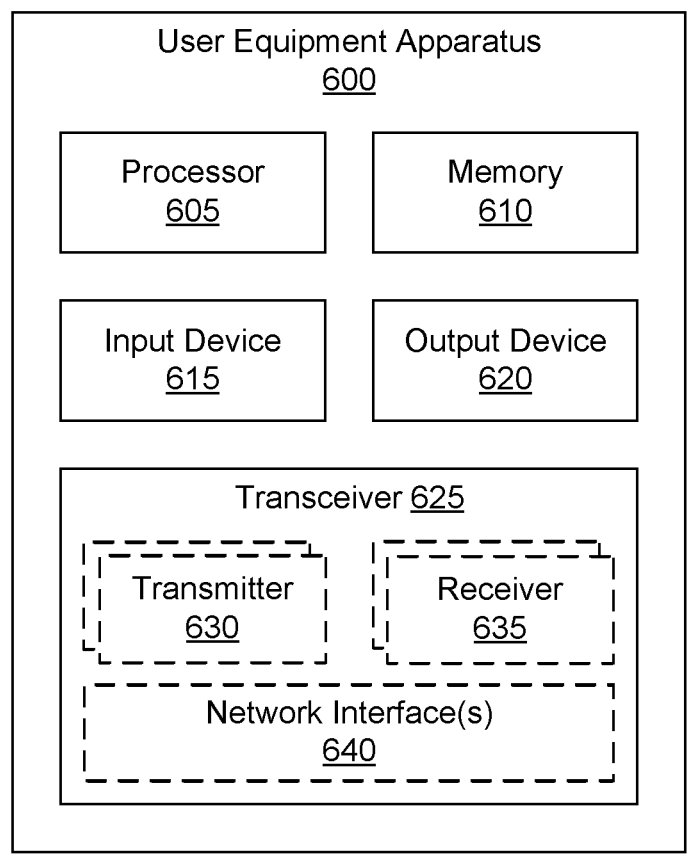
FIG. 6 is a diagram illustrating one embodiment of a user equipment apparatus that may be used for aggregating HARQ feedback and sidelink retransmission procedure.

FIG. 6 depicts a user equipment apparatus 600 that may be used for aggregating HARQ feedback and sidelink retransmission procedure, according to embodiments of the disclosure. In various embodiments, the user equipment apparatus 600 is used to implement one or more of the solutions described above. The user equipment apparatus 600 may be one embodiment of the AMF, described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In some embodiments, the processor 605 transmits SL data (via transceiver 625) the to a set of receiver V2X UEs and listens for SL feedback from the set of the receiver V2X UEs, the SL feedback indicating whether a receiver V2X UE successfully decoded the SL data transmission. The processor 605 aggregates HARQ feedback and sends an Aggregated Feedback message to a RAN node (via transceiver 625), the Aggregated Feedback message containing the aggregated HARQ feedback.

In certain embodiments, the processor further determines a transmission mode for retransmission of the SL data, wherein the transmission mode is selected from: groupcast transmission and M-unicast transmissions. Here, M is an integer less than the number of receiver V2X UEs. In such embodiments, the Aggregated Feedback message requests the determined transmission mode. In some embodiments, the transceiver receives a re-transmission grant from the RAN node, where the re-transmission grant indicates a cast type for the retransmission. In such embodiments, the processor performs retransmission of the SL data according to a cast type indicated in the re-transmission grant.

In various embodiments, the SL feedback is received over a sidelink channel, such as PSCCH, PSSCH, or a sidelink feedback channel. In certain embodiments, the SL feedback includes an ACK indicating successful reception and decoding of the SL data. In certain embodiments, the SL feedback includes a NACK indicating unsuccessful decoding of the SL data. In certain embodiments, the SL feedback includes a DTX indication that no PSSCH (carrying the SL data) was detected. In certain embodiments, the receiver V2X UE does not receive the control signaling (i.e., PSCCH) scheduling the PSSCH, therefore the receiver V2X UE does not send any SL feedback.

In some embodiments, aggregating HARQ feedback includes generating an ACK if all UEs in the set of receiver V2X UEs transmit ACK and otherwise generating a NACK. In such embodiments, the processor may track from which receiver V2X UE a SL feedback (ACK or NACK) was received and from which receiver V2X UE no SL feedback has been received.

In some embodiments, aggregating HARQ feedback includes determining whether a number of positive acknowledgements received is same as a total number of UEs in the set of receiver V2X UEs and generating a negative acknowledgement if the number of positive acknowledgements received is not the same as the total number of UEs in the set of receiver V2X UEs.

In some embodiments, aggregating HARQ feedback includes tracking which ones of the set of receive V2X UEs transmit positive acknowledgement. In such embodiments, transmitting the Aggregated Feedback message to the RAN node includes sending a positive acknowledgement to the RAN node in response to each V2X UE transmitting at least one positive acknowledgement message to the user equipment apparatus 600 (i.e., the transmitter V2X UE).

In some embodiments, the Aggregated Feedback message indicates a number of receiver V2X UEs that provided SL feedback and/or a total number of UEs in the set of receiver V2X UEs. In some embodiments, transmitting the Aggregated Feedback message to a RAN node includes the processor identifying a grant of feedback resources on a Uu interface to the RAN node, said grant identified using DCI received from the RAN node. In certain embodiments, the feedback resources are available an indicated amount of time after reception of the DCI (i.e., indicated by the parameter '$K_c$' or '$K_d$' signaled in the DCI, as discussed above).

In some embodiments, the SL feedback from the receiver V2X UEs is to be received within a window of time after transmission of the SL data. In such embodiments, the feedback resources are available an indicated amount of time after the window of time for receiving SL feedback. In certain embodiments, the feedback resources include a set of physical resource blocks, wherein the processor further identifies the set of physical resource blocks using the DCI. In some embodiments, the memory 610 stores data related to sidelink HARQ operation. For example, the memory 610 may store V2X communication resources, HARQ processes, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. Additionally, the transceiver 625 may support at least one network interface 640. Here, the at least one network interface 640 facilitates communication with a RAN node, such as an eNB or gNB, for example using the "Uu" interface (e.g., LTE-Uu for eNB, NR-Uu for gNB). Additionally, the at least one network interface 640 may include an interface used for communications with one or more network functions in the mobile core network, such as a UPF 141, an AMF 143, and/or a SMF 145.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module. In certain embodiments, the transceiver 625 may implement a 3GPP modem (e.g., for communicating via NR or LTE access networks) and a non-3GPP modem (e.g., for communicating via Wi-Fi or other non-3GPP access networks).

Figure 7:
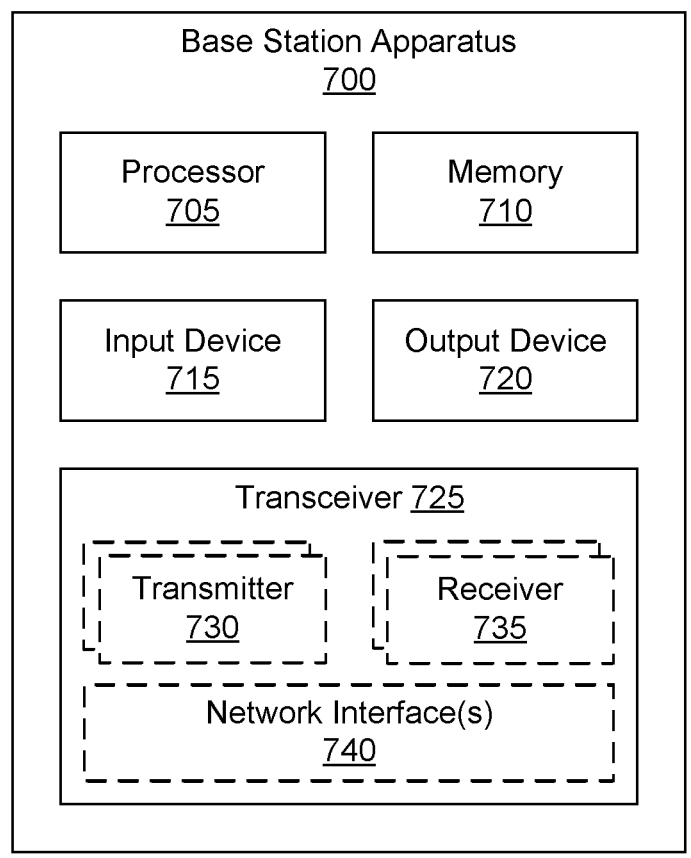
FIG. 7 is a diagram illustrating one embodiment of a base station apparatus that may be used for aggregating HARQ feedback and sidelink retransmission procedure.

FIG. 7 depicts a base station apparatus 700 that may be used for protecting the user identity and credentials, according to embodiments of the disclosure. In various embodiments, the base station apparatus 700 is used to implement one or more of the solutions described above. The base station apparatus 700 may be one embodiment of the AMF, described above. Furthermore, the base station apparatus 700 may include a processor 705, a memory 710, an input device 715, an output device 720, and a transceiver 725. In some embodiments, the input device 715 and the output device 720 are combined into a single device, such as a touchscreen. In certain embodiments, the base station apparatus 700 may not include any input device 715 and/or output device 720. In various embodiments, the base station apparatus 700 may include one or more of: the processor 705, the memory 710, and the transceiver 725, and may not include the input device 715 and/or the output device 720.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the base station apparatus 700 to implement the above described RAN node behaviors. For example, the processor 705 may receive (via transceiver 725) a SL BSR from a V2X UE. In response, the processor 705 may allocate to the V2X UE PSCCH, PSSCH, and/or PUCCH resources. If PUCCH resources are allocated with the SL grant, the processor 705 receives (via transceiver 725) aggregated HARQ feedback.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to sidelink HARQ operation. For example, the memory 710 may store V2X communication resources, HARQ process IDs, UE configurations, and the like. In certain embodiments, the memory 710 also stores program code and related data, such as an operating system or other controller algorithms operating on the base station apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the base station apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to send messages to the RAN, as described herein. Similarly, one or more receivers 735 may be used to receive messages from the RAN, as described herein. Although only one transmitter 730 and one receiver 735 are illustrated, the base station apparatus 700 may have any suitable number of transmitters 730 and receivers 735. Further, the transmitter(s) 725 and the receiver(s) 730 may be any suitable type of transmitters and receivers.

In various embodiments, the transceiver 725 supports one or more network interfaces 740 for communicating with a UE and/or network function. For example, the transceiver 725 may support an "Uu" interface with the UE. Additionally, the transceiver 725 may support various 7GC service interfaces, such as the N2 interface and/or N3 interface.

Figure 8:
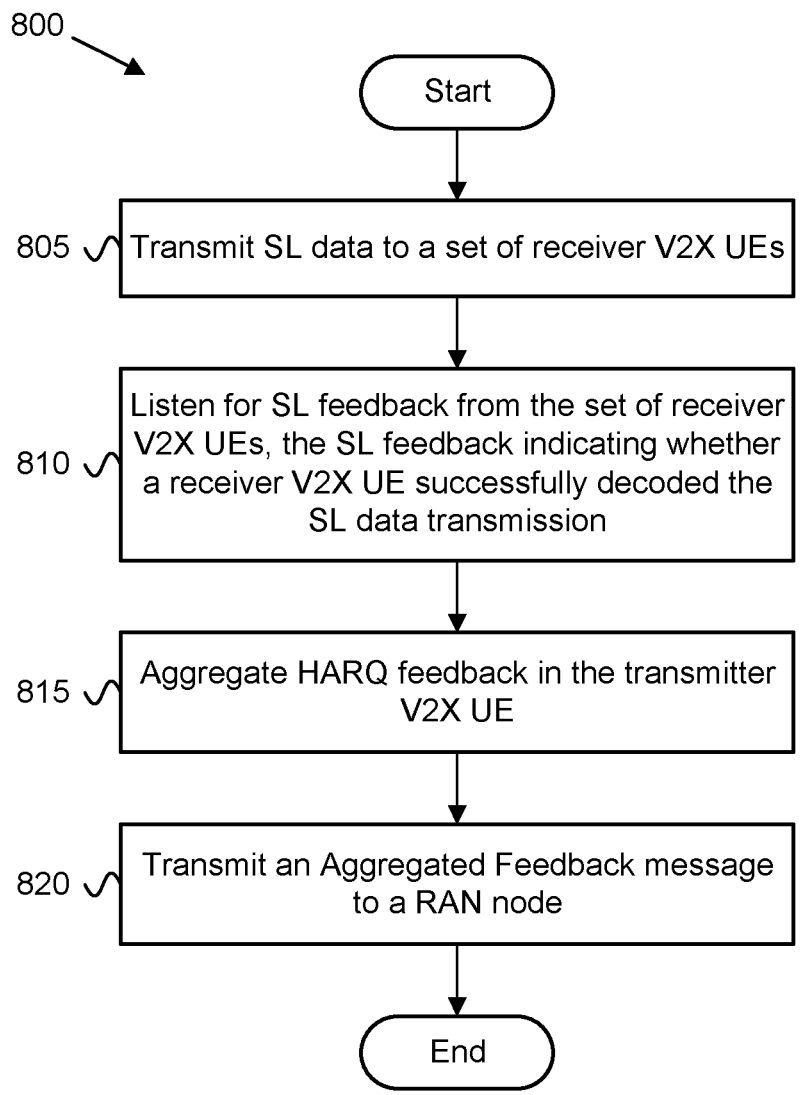
FIG. 8 is a flowchart diagram illustrating one embodiment of a method that may be used for aggregating HARQ feedback and sidelink retransmission procedure.

FIG. 8 depicts one embodiment of a method 800 for aggregating HARQ feedback and sidelink retransmission procedure, according to embodiments of the disclosure. In various embodiments, the method 800 is performed by a transmitter V2X UE, such as the remote unit 105, the UE 205, and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and transmits 805 SL data to a set of receiver V2X UEs. The method 800 includes listening 810 for SL feedback from the set of receiver V2X UEs, the SL feedback indicating whether a receiver V2X UE successfully decoded the SL data transmission. The method 800 includes aggregating 815 HARQ feedback in the transmitter V2X UE. The method 800 includes transmitting 820 an Aggregated Feedback message to a RAN node. The method 800 ends.

Disclosed herein is a first apparatus for managing uplink preemption, according to embodiments of the disclosure. The first apparatus may be implemented by a transmitter V2X UE, such as the remote unit 105, the UE 205, and/or the user equipment apparatus 600. The first apparatus includes a transceiver that transmits SL data to a set of receiver V2X UEs and listens for SL feedback from the set of receiver V2X UEs, the SL feedback indicating whether a receiver V2X UE successfully decoded the SL data transmission. The first apparatus also includes a processor that aggregates HARQ feedback and sends an Aggregated Feedback message to a RAN node, the Aggregated Feedback message containing the aggregated HARQ feedback.

In certain embodiments, the processor further determines a transmission mode for retransmission of the SL data, wherein the transmission mode is selected from: groupcast transmission and M-unicast transmissions. Here, M is an integer less than the number of receiver V2X UEs. In such embodiments, the Aggregated Feedback message requests the determined transmission mode. In some embodiments, the transceiver receives a re-transmission grant from the RAN node, where the re-transmission grant indicates a cast type for the retransmission. In such embodiments, the processor performs retransmission of the SL data according to a cast type indicated in the re-transmission grant.

In various embodiments, the SL feedback is received over a sidelink channel, such as PSCCH, PSSCH, or a sidelink feedback channel. In certain embodiments, the SL feedback includes an ACK indicating successful reception and decoding of the SL data. In certain embodiments, the SL feedback includes a NACK indicating unsuccessful decoding of the SL data. In certain embodiments, the SL feedback includes a DTX indication that no PSSCH (carrying the SL data) was detected. In certain embodiments, the receiver V2X UE does not receive the control signaling (i.e., PSCCH) scheduling the PSSCH, therefore the receiver V2X UE does not send any SL feedback.

In some embodiments, aggregating HARQ feedback includes generating an ACK if all UEs in the set of receiver V2X UEs transmit ACK and otherwise generating a NACK. In such embodiments, the processor may track from which receiver V2X UE a SL feedback (ACK or NACK) was received and from which receiver V2X UE no SL feedback has been received.

In some embodiments, aggregating HARQ feedback includes determining whether a number of positive acknowledgements received is same as a total number of UEs in the set of receiver V2X UEs and generating a negative acknowledgement if the number of positive acknowledgements received is not the same as the total number of UEs in the set of receiver V2X UEs.

In some embodiments, aggregating HARQ feedback includes tracking which ones of the set of receive V2X UEs transmit positive acknowledgement. In such embodiments, transmitting the Aggregated Feedback message to the RAN node includes sending a positive acknowledgement to the RAN node in response to each V2X UE transmitting at least one positive acknowledgement message to the first apparatus.

In some embodiments, the Aggregated Feedback message indicates a number of receiver V2X UEs that provided SL feedback and/or a total number of UEs in the set of receiver V2X UEs. In some embodiments, transmitting the Aggregated Feedback message to a RAN node includes the processor identifying a grant of feedback resources on a Uu interface to the RAN node, said grant identified using DCI received from the RAN node. In certain embodiments, the feedback resources are available an indicated amount of time after reception of the DCI.

In some embodiments, listening for SL feedback from the set of receiver V2X UEs includes waiting to receive the SL feedback during a window of time after transmission of the SL data. In such embodiments, the feedback resources are available an indicated amount of time after the window of time for receiving SL feedback. In certain embodiments, the feedback resources include a set of physical resource blocks, wherein the processor further identifies the set of physical resource blocks using the DCI.

Disclosed herein is a first method for aggregating HARQ feedback and sidelink retransmission procedure, according to embodiments of the disclosure. The first method may be performed by a transmitter V2X UE, such as the remote unit 105, the UE 205, and/or the user equipment apparatus 600. The first method includes transmitting SL data to a set of receiver V2X UEs and listening for SL feedback from the set of receiver V2X UEs, the SL feedback indicating whether a receiver V2X UE successfully decoded the SL data transmission. The first method includes aggregating HARQ feedback in the transmitter V2X UE and transmitting an Aggregated Feedback message to a RAN node, the Aggregated Feedback message containing the aggregated HARQ feedback.

In certain embodiments, the processor further determines a transmission mode for retransmission of the SL data, wherein the transmission mode is selected from: groupcast transmission and M-unicast transmissions. Here, M is an integer less than the number of receiver V2X UEs. In such embodiments, the Aggregated Feedback message requests the determined transmission mode. In some embodiments, the transceiver receives a re-transmission grant from the RAN node, where the re-transmission grant indicates a cast type for the retransmission. In such embodiments, the processor performs retransmission of the SL data according to a cast type indicated in the re-transmission grant.

In various embodiments, the SL feedback is received over a sidelink channel, such as PSCCH or a sidelink feedback channel. In certain embodiments, the SL feedback includes an ACK indicating successful reception and decoding of the SL data. In certain embodiments, the SL feedback includes a NACK indicating unsuccessful decoding of the SL data. In certain embodiments, the SL feedback includes a DTX indication that no SL data was detected. In some embodiments, aggregating HARQ feedback in the transmitter V2X UE includes generating an ACK if all UEs in the set of receiver V2X UEs transmit ACK and otherwise generating a NACK. In such embodiments, the processor may track from which receiver V2X UE a SL feedback (ACK or NACK) was received and from which receiver V2X UE no SL feedback has been received.

In some embodiments, aggregating HARQ feedback in the transmitter V2X UE includes determining whether a number of positive acknowledgements received is same as a total number of UEs in the set of receiver V2X UEs and generating a negative acknowledgement if the number of positive acknowledgements received is not the same as the total number of UEs in the set of receiver V2X UEs.

In some embodiments, aggregating HARQ feedback in the transmitter V2X UE includes tracking which ones of the set of receive V2X UEs transmit positive acknowledgement. In such embodiments, transmitting the Aggregated Feedback message to the RAN node includes sending a positive acknowledgement to the RAN node in response to each V2X UE transmitting at least one positive acknowledgement message to the transmitter V2X UE.

In some embodiments, the Aggregated Feedback message indicates a number of receiver V2X UEs that provided SL feedback and/or a total number of UEs in the set of receiver V2X UEs. In some embodiments, transmitting the Aggregated Feedback message to a RAN node includes the processor identifying a grant of feedback resources on a Uu interface to the RAN node, said grant identified using DCI received from the RAN node. In certain embodiments, the feedback resources are available an indicated amount of time after reception of the DCI.

In some embodiments, listening for SL feedback from the set of receiver V2X UEs includes waiting to receive the SL feedback during a window of time after transmission of the SL data. In such embodiments, the feedback resources are available an indicated amount of time after the window of time for receiving SL feedback. In certain embodiments, the feedback resources include a set of physical resource blocks, wherein the processor further identifies the set of physical resource blocks using the DCI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that:
transmits sidelink ("SL") data to a set of receiver vehicle-to-everything ("V2X") user equipment devices ("UEs"); and
listens for SL feedback from the set of the receiver V2X UEs, the SL feedback indicating whether a receiver V2X UE successfully decoded the SL data transmission; and
a processor that:
aggregates hybrid automatic repeat request ("HARQ") feedback, wherein aggregating HARQ feedback comprises generating a positive acknowledgement if all UEs in the set of receiver V2X UEs transmit positive acknowledgement and otherwise generating a negative acknowledgement; and
sends an Aggregated Feedback message to a radio access network ("RAN") node, the Aggregated Feedback message containing the aggregated HARQ feedback.

2. The apparatus of claim 1, wherein aggregating HARQ feedback comprises tracking which ones of the set of receive V2X UEs transmit positive acknowledgement, wherein transmitting the Aggregated Feedback message to the RAN node comprises sending a positive acknowledgement to the RAN node in response to each V2X UE transmitting at least one positive acknowledgement message to the apparatus.

3. The apparatus of claim 1, wherein aggregating HARQ feedback comprises:
determining whether a number of positive acknowledgements received is same as a total number of UEs in the set of receiver V2X UEs and
generating a positive acknowledgement if the number of positive acknowledgements received is not the same as the total number of UEs in the set of receiver V2X UEs.

4. The apparatus of claim 1, wherein the processor further determines a transmission mode for retransmission of the SL data, wherein the transmission mode is selected from: groupcast transmission and M-unicast transmissions, wherein M is an integer less than the number of receiver V2X UEs, wherein the Aggregated Feedback message requests the determined transmission mode.

5. The apparatus of claim 1, wherein the Aggregated Feedback message indicates a number of receiver V2X UEs that provided SL feedback and/or a total number of UEs in the set of receiver V2X UEs.

6. The apparatus of claim 1, wherein transmitting the Aggregated Feedback message to a RAN node comprises the processor identifying a grant of feedback resources on a Uu interface to the RAN node, said grant identified using downlink control information ("DCI") received from the RAN node.

7. The apparatus of claim 6, wherein the feedback resources are available an indicated amount of time after reception of the DCI.

8. The apparatus of claim 6, wherein listening for SL feedback from the set of receiver V2X UEs comprising waiting to receive the SL feedback during a window of time after transmission of the SL data, wherein the feedback resources are available an indicated amount of time after the window of time for receiving SL feedback.

9. The apparatus of claim 6, wherein the feedback resources comprise comprises a set of physical resource blocks, wherein the processor further identifies the set of physical resource blocks using the DCI.

10. A method of a transmitter vehicle-to-everything ("V2X") user equipment device ("UE") comprising:
transmitting sidelink ("SL") data to a set of receiver V2X UEs;
listening for SL feedback from the set of receiver V2X UEs, the SL feedback indicating whether a receiver V2X UE successfully decoded the SL data transmission;
aggregating hybrid automatic repeat request ("HARQ") feedback in the transmitter V2X UE, wherein aggregating HARQ feedback in the transmitter V2X UE comprises generating a positive acknowledgement if all UEs in the set of receiver V2X UEs transmit positive acknowledgement and otherwise generating a negative acknowledgement; and
transmitting an Aggregated Feedback message to a radio access network ("RAN") node, the Aggregated Feedback message containing the aggregated HARQ feedback.

11. The method of claim 10, wherein aggregating HARQ feedback in the transmitter V2X UE comprises tracking which ones of the set of receive V2X UEs transmit positive acknowledgement, wherein transmitting the Aggregated Feedback message to the RAN node comprises sending a positive acknowledgement to the RAN node in response to each V2X UE transmitting at least one positive acknowledgement message to the transmitter V2X UE.

12. The method of claim 10, wherein aggregating HARQ feedback in the transmitter V2X UE comprises:
determining whether a number of positive acknowledgements received is same as a total number of UEs in the set of receiver V2X UEs, and generating a positive acknowledgement if the number of positive acknowledgements received is not the same as the total number of UEs in the set of receiver V2X UEs.

13. The method of claim 10, further comprising determining a transmission mode for retransmission of the SL data, wherein the transmission mode is selected from:
groupcast transmission and M-unicast transmissions, wherein M is an integer less than the number of receiver V2X UEs, wherein the Aggregated Feedback message requests the determined transmission mode.

14. The method of claim 10, the Aggregated Feedback message indicates a number of receiver V2X UEs that provided SL feedback and/or a total number of UEs in the set of receiver V2X UEs.

15. The method of claim 10, wherein transmitting the Aggregated Feedback message to a RAN node comprises identifying a grant of feedback resources on a Uu interface to the RAN node, said grant identified using downlink control information ("DCI") received from the RAN node.

16. The method of claim 15, wherein the feedback resources are available an indicated amount of time after reception of the DCI.

17. The method of claim 15, wherein listening for SL feedback from the set of receiver V2X UEs comprises waiting to receive the SL feedback during a window of time after transmission of the SL data, wherein the feedback resources are available an indicated amount of time after the window of time for receiving SL feedback.

18. The method of claim 15, wherein the feedback resources comprise a set of physical resource blocks, the method further comprising identifying the set of physical resource blocks using the DCI.

* * * * *